(12) United States Patent
Anderson

(10) Patent No.: US 7,580,080 B2
(45) Date of Patent: Aug. 25, 2009

(54) AUTOMATIC LAUNCH OF PICTURE-IN-PICTURE DURING COMMERCIALS

(75) Inventor: Glen Anderson, Beaverton, OR (US)

(73) Assignee: Gateway, Inc., Poway, CA (US)

( * ) Notice: Subject to any disclaimer, the term of this patent is extended or adjusted under 35 U.S.C. 154(b) by 731 days.

(21) Appl. No.: 11/284,699

(22) Filed: Nov. 22, 2005

(65) Prior Publication Data

US 2007/0115391 A1    May 24, 2007

(51) Int. Cl.
*H04N 5/45*    (2006.01)
*H04N 7/10*    (2006.01)

(52) U.S. Cl. .......................................... 348/565; 725/32

(58) Field of Classification Search ......... 348/563–565, 348/569, 553
See application file for complete search history.

(56) References Cited

U.S. PATENT DOCUMENTS

| | | | |
|---|---|---|---|
| 4,230,990 A * | 10/1980 | Lert et al. | 725/22 |
| 5,029,007 A | 7/1991 | Spiero | |
| 5,161,019 A | 11/1992 | Emanuel | |
| 5,432,561 A | 7/1995 | Strubbe | |
| 5,880,789 A * | 3/1999 | Inaba | 725/137 |
| 5,973,723 A * | 10/1999 | DeLuca | 725/34 |
| 6,002,443 A * | 12/1999 | Iggulden | 348/553 |
| 6,320,623 B1 | 11/2001 | Cavallerano et al. | |
| 6,597,405 B1 * | 7/2003 | Iggulden | 348/553 |
| 6,697,123 B2 * | 2/2004 | Janevski et al. | 348/565 |
| 6,771,316 B1 * | 8/2004 | Iggulden | 348/553 |
| 7,124,365 B2 * | 10/2006 | Cavallerano et al. | 715/716 |
| 7,206,029 B2 * | 4/2007 | Cohen-Solal | 348/565 |
| 7,328,450 B2 * | 2/2008 | Macrae et al. | 725/42 |
| 7,454,773 B2 * | 11/2008 | Pugel et al. | 725/33 |
| 2005/0015795 A1 * | 1/2005 | Iggulden | 725/20 |

\* cited by examiner

*Primary Examiner*—Paulos M Natnael
(74) *Attorney, Agent, or Firm*—Pearne & Gordon LLP

(57) ABSTRACT

Methods and systems are provided for automatically launching a picture-in-picture (PIP) display on a television screen in response to detecting a commercial break. PIP launch scheme information is stored in a memory and retrieved upon the detection of a commercial break during a television broadcast. The PIP launch scheme information specifies the size and position of the PIP display, and a television signal source and channel for the PIP and the main television display to be shown during the commercial break.

17 Claims, 3 Drawing Sheets

AUTOMATIC LAUNCH OF PICTURE-IN-PICTURE DURING COMMERCIALS

BACKGROUND

1. Field

The present invention relates to television displays, and more specifically to the picture-in-picture feature of a television display.

2. Background

Picture-in-picture (PIP) has become a very popular feature for television sets sold over the past several years. The PIP feature allows a television screen to display a main channel of interest received by the television receiver as a main picture and also display a smaller overlay-version of a different channel as a PIP picture. In this way a person watching the television can monitor an alternate source in the PIP window while watching content of the main channel on the remainder of the television screen. The PIP window may display any signal capable of being displayed on the television, including other television channels from a second tuner or TV signals from another source such as a VCR, a video camera or the like.

The PIP window may also be used to display a video signal while the primary window is displaying other information such as an on-screen guide showing the channel and schedule information of the various channels received by the television, e.g. an electronic program guide (EPG). When the on-screen guide is in the primary window, the PIP window may either display a channel of interest or the channel that is highlighted on the guide, depending on how the television is set up.

SUMMARY

Embodiments disclosed herein address the above stated needs by providing systems and methods for automatically launching a PIP display on a television screen in response to detecting a commercial break during the show being watched. Upon detecting a commercial break during the television broadcast, the system retrieves PIP launch scheme information which specifies the television signal source and television channel to show in the PIP during the commercials. The PIP launch scheme information may also specify the size and position of the PIP display. The PIP display is then launched in response to detecting the commercial break and in accordance with the PIP launch scheme information. In some embodiments, once the system detects the end of the commercial break, the television screen is returned to its normal state.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
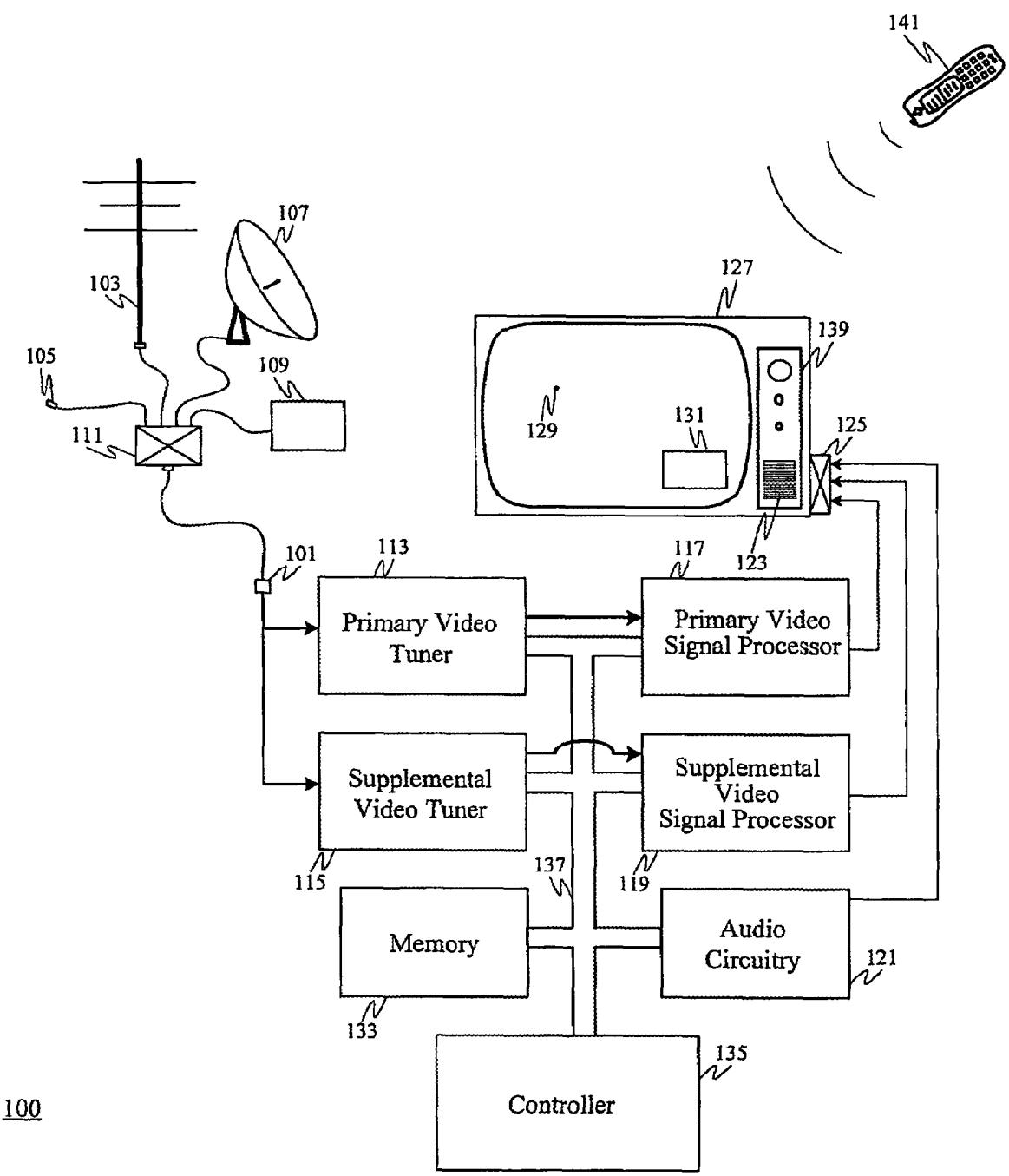
FIG. 1 depicts an exemplary system for implementing various embodiments of the invention.

FIG. 1 depicts an exemplary television receiver system 100 suitable for implementing various embodiments of the invention. The television receiver 100 typically includes an input interface 101 for receiving television signals. The input interface 101 may receive television signals from a broadcast antenna 103, a terrestrial cable system 105, a satellite dish antenna 107, a video storage unit 109 (e.g., DVD, VCR or other video storage memory unit), or other sources of television signals such as a video camera or the like. In some embodiments, one or more of the television signal inputs 103-109 may be located within the chassis of the television receiver 100. For example, the television may include an internal broadcast antenna 103, video storage 109 or other like source of television signals. The various television signal inputs 103-109 may be switched with an external switch 111, or may be fed directly to the television system separately and switched within the television set.

The input interface 101 is connected to one or more television tuners such as the primary video tuner 113 and the supplemental video tuner 115. Additional tuners (not shown) may be included as part of the television receiver system 100. The input interface 101 and/or the external switch 111 (if any) is configured such that the primary tuner 113 can receive signals from one source (e.g., satellite dish 107) at the same time as the supplemental tuner 115 is receiving signals from another source (e.g., cable system 105). The primary tuner 113 and supplemental tuner 115 may also receive different signals from the same source at the same time, e.g., two different channels from the cable system 105.

The video tuners 113 and 115, in turn, are respectively connected to one or more signal processors such as video signal processors 117 and 119. An output of the video tuners 113 and 115 carries television video signals to respective video signal processors sections 117 and 119. In some implementations the video tuners 113/115 and video signal processors 117/119 may be packaged within the same subunits, electronic subassemblies or component chassis, and have multiple inputs and/or outputs. The video signal processors sections 117 and 119 may include, or be connected to, matrix circuitry 125 which generates RGB color signals (red, green, blue), which are then applied to a television display 127. Audio circuitry 121 may include an audio signal processor and audio amplifier(s) to process and amplify the audio portion of the television signal for sound to accompany the video. The audio circuitry 121 is typically connected to a speaker 123 within the television itself or a sound system operating in conjunction with the television. The television receiver system 100 also typically includes one or more power supplies, transformers and converters for supplying power to the various components.

A controller 135 is connected to the video tuners 113-115, the video signal processors 117-119, the audio circuitry 121, and other components of the television receiver system 100. The controller 135 controls the various components to tune the system to the desired television channels, and controls the audio and video signal processing. The controller 135 may be embodied as a microprocessor which includes, or is connected to, a memory 133 configured to store software, routines and instructions for controlling the system 100 and performing the activities in accordance with methods of the various embodiments. The controller 135 may be connected to the other sections of the television system 100 via discrete control lines, via the bus 137, or a combination of both. Controller 135 typically controls the operation of the tuners 113-115, the video signal processors 117-119, the audio circuitry 121, video switch 125 and other components of the television receiver system 100. The controller 135 functions to select television sources and channels for the primary display 129 and the PIP display 131, and controls the processing of the video signals. For example, the controller 135 may controls the various components to selectively display either a TV broadcast on the primary display 129 only, or else one TV broadcast on the primary display 129 and another TV broadcast on the PIP display 131. In some embodiments the primary display 129 shows signals decoded and processed by the video tuner 113 and video signal processor 117, and the PIP display 131 shows signals from the video tuner 115 and video signal processor 119. In other embodiments the video tuner 113 and video signal processor 117 are tuned to one channel and the video tuner 115 and video signal processor 119 are tuned to another channel, with the selected channels being switched back and forth between the primary display 129 and the PIP display 131—that is, the tuners and video signal processors remain tuned to their respective channels and the outputs are switched back and forth between the primary display 129 and the PIP display 131. The controller 135 may also adjust position, size and transparency of PIP window 131.

The television signals for the primary display 129 are typically derived from the primary video tuner 113 and the primary video signal processor 117 while the signals for the PIP display 131 are provided by the extra television circuitry, that is, supplemental video tuner 115 and supplemental video signal processor 119. In some embodiments, the circuitry need not be dedicated to the primary signal and the supplemental signals. Instead, either set of circuitry may process television signals which can be used for the primary display or the PIP display, or vice versa. Such circuitry could be known as a first tuner and a second tuner, rather than a primary tuner and a supplemental tuner. For the purposes of illustration, the supplemental video signal processor 119 may be thought of as providing the processed video signal for the PIP display. The PIP signal may be a sub-sampled video signal sent to video switch 125 which also receives video signals for the primary display from primary video signal processor 117. The video switch 125, in turn, provides video signals for driving the television display 127.

The television receiver system 100 may be controlled by manual controls 139 or a wireless remote control 141, either of which may be used to enter the PIP launch settings and control parameters for the auto PIP launch feature described herein. Further, in accordance with some embodiments, the remote control 141 may contain a microprocessor and memory for storing and executing the settings and parameters for the auto PIP launch feature, or even the computer program, routine or other logic which implements the auto PIP launch feature. In embodiments in which the remote control 141 stores information for implementing the auto PIP launch feature, the remote control 141 may transmit some of the PIP launch settings and control parameters to the television's controller 135 in response to a commercial break being detected. This allows the remote control 141 to control the PIP to be launched in the correct format with the predefined television signal source, as specified in accordance with a PIP launch control scheme.

Figure 2A:
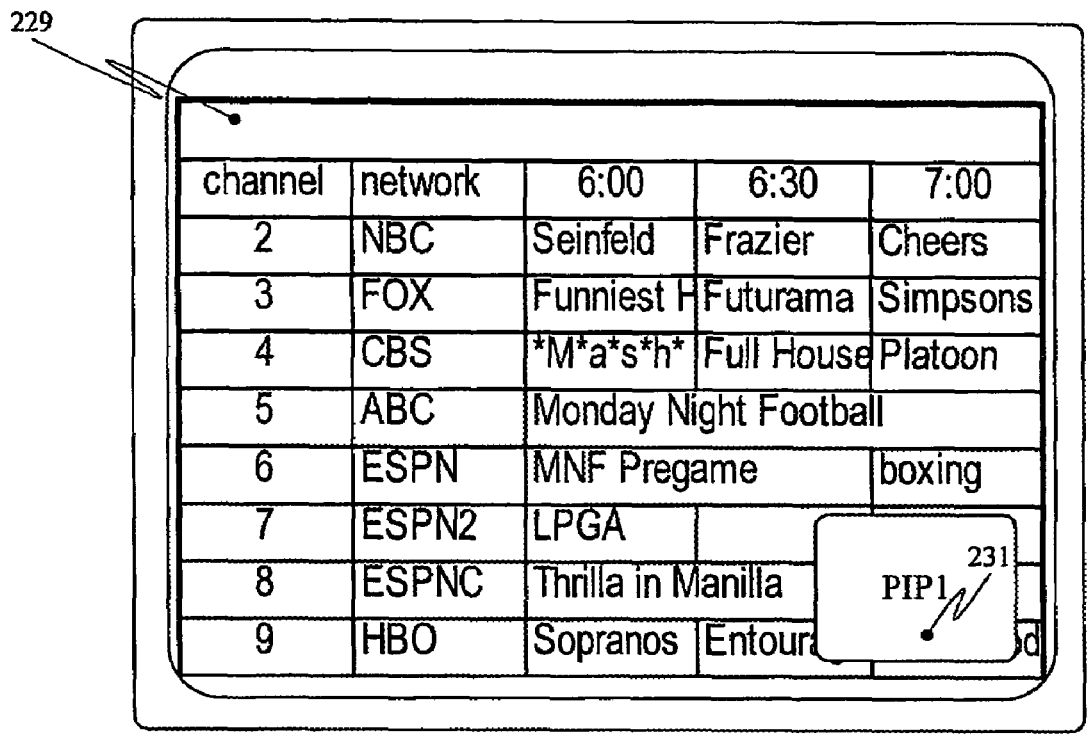
FIGS. 2A and 2B depict examples of picture-in-picture displays.
Figure 2B:
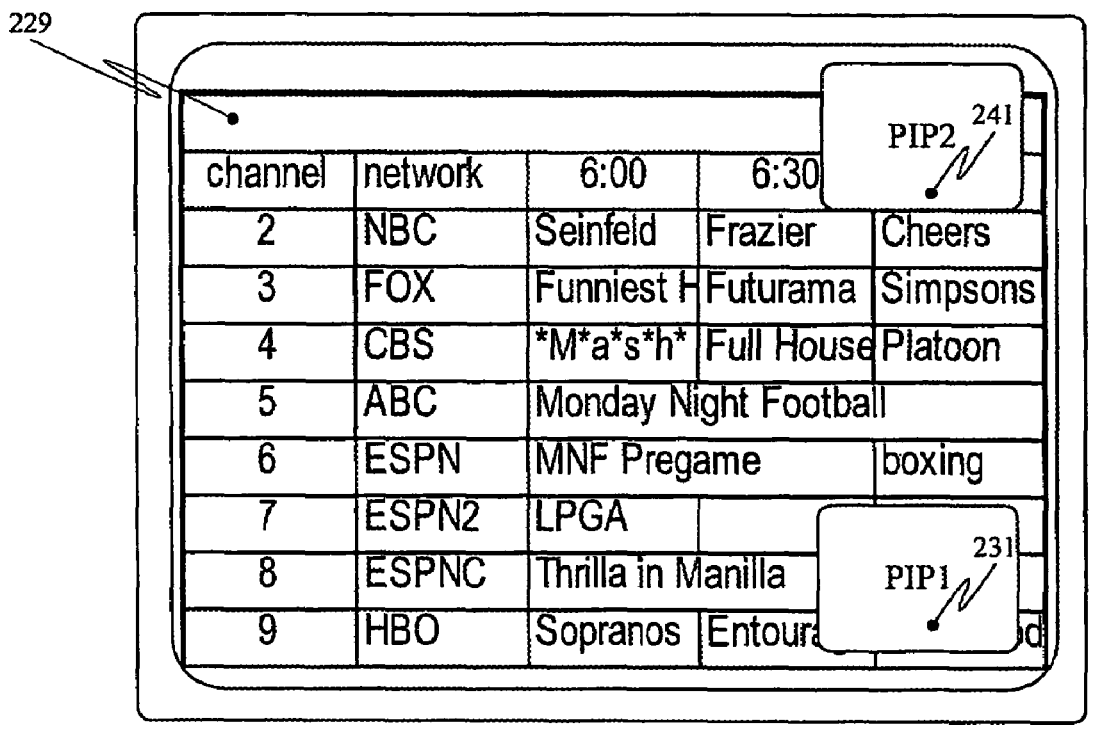

FIGS. 2A and 2B depict examples of picture-in-picture displays. PIP displays such as the PIP 231 typically overlay a portion of the primary display 229. In some implementations the PIP display(s) may be shown side-by-side, underneath or above the primary display, thus avoiding a portion of the primary display from being occluded. Both FIG. 2A and FIG. 2B depict an on-screen scheduling guide with channel and schedule information for a number of channels received by the television receiver system 100. FIG. 2A has one PIP display 231 which may show a television signal of interest to the user while the user scrolls through the scheduling information looking at what is available on the various channels available to the television system 100. For example, the user may be watching Monday Night Football in the primary display 229 when a commercial advertisement comes on. When the user activates the guide function for his television, primary display 229 shows the guide information, as depicted in FIG. 2A, and the channel with Monday Night Football is displayed in the PIP display 231. This allows the user to peruse the guide, and yet be alerted when the commercial is over since the user can see the football game starting back up.

In accordance with various embodiments disclosed herein, when a commercial message comes on the PIP window launches automatically under control of the autolaunch PIP feature. In situations in which no PIP display was being watched when a commercial starts, the system automatically launches a PIP display 231 and shows the program in the PIP display 231 that had been shown in the primary display 229 before the commercial began. In such situations the primary display 229 may show a guide, or a prespecified channel (e.g., CNN, ESPN, etc.) or another source such as a DVD movie. In situations in which the user was watching a show in the PIP display 231 at the time the commercial comes on, the windows may switch places, e.g., the Monday Night Football channel is shown in the PIP display 231 during the commercial and the channel which had been in the PIP is then shown in the primary window 229.

FIG. 2B shows another embodiment with two PIP windows. In this embodiment, when a commercial comes on during Monday Night Football and the guide feature is activated the television system 100 displays the guide in the primary window 229, the Monday Night Football channel in the first PIP display 231, and also has a second PIP display 241 which may be used to show what is presently airing on one of the channels highlighted on the guide. For example, as the user scrolls down through the guide, the second PIP display 241 displays information from the channel highlighted (or indicated by a cursor) from the guide. The information may either be a video feed or may simply be associated information such as the channel's logo (e.g., the HBO logo) or a description of the highlighted channel. Since there is sometimes a short delay in tuning into a channel, the associated information (e.g., logo or description) may, in some embodiments, be displayed temporarily until the video for the highlighted channel is tuned in and can be displayed.

In other embodiments the primary display 229 may be used to show something other than the guide information. For example, the user may be watching Monday Night Football on the primary display 229 and an episode of Seinfeld on the PIP display 231 of FIG. 2A. When a commercial comes on the displays may switch content so that Seinfeld is on the primary display 229 and the Monday Night Football channel (showing the commercial) is on the PIP display 231. In some embodiments when the commercial ends the displays switch back to their original format, Football on the primary display 229 and Seinfeld in the PIP display 231.

Figure 3:
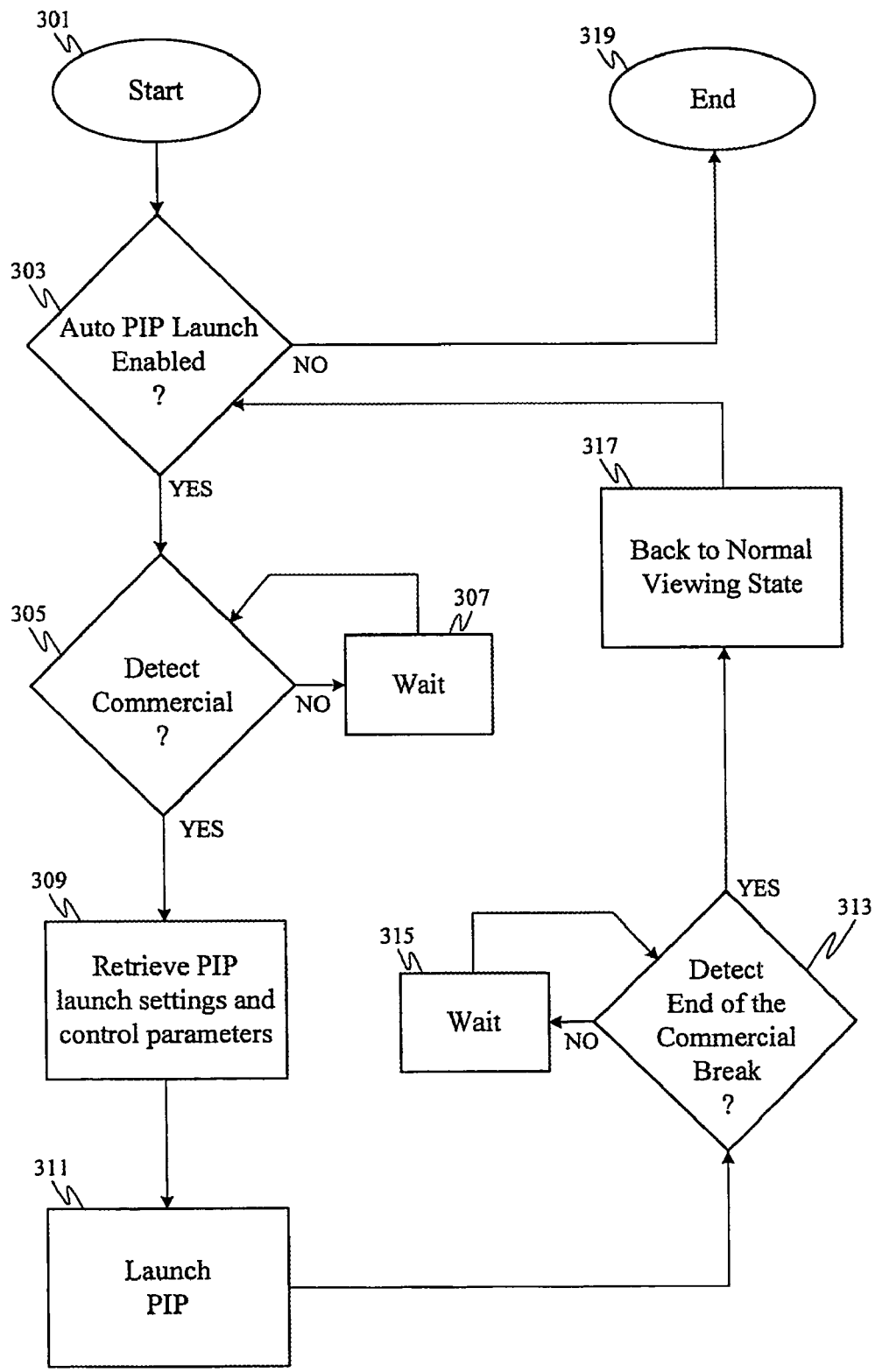
FIG. 3 is a flowchart depicting exemplary activities which take place in a method for performing various embodiments of the invention.

FIG. 3 is a flowchart depicting exemplary activities which take place in a method for performing various embodiments. The method begins at 301 and proceeds to 303 to determine whether the autolaunch PIP feature is enabled and active. If the feature is not active the method proceeds along the "NO" branch to 319 and ends. If, in 303, it is determined that the autolaunch PIP feature is enabled the method proceeds from 303 along the "YES" branch to 305.

In 305 it is determined whether or not a commercial at the beginning of a commercial break has been detected during a television broadcast. Commercial breaks often include more than one commercial (e.g., three to five commercials, sometimes more) and may last from a couple of minutes to four minutes or more. The television broadcast may be from a land-based broadcast TV station, a satellite TV signal, a cable signal, a stored TV signal (e.g., from a VCR, DVD, Tivo,™ etc.) or any other like type of television broadcast signal. The detection of the television commercial may be performed by any method or system designed for such purpose, including, for example, any of the methods and systems described in U.S. Pat. No. 6,901,606 to Wright, et al.; and U.S. Pat. No. 6,856,758 to Iggulden; U.S. Pat. No. 6,285,818 to Suito, et al.; and U.S. Pat. No. 5,999,689 to Iggulden, the disclosure of each of these patents hereby being incorporated by reference herein in their respective entireties. For example, commercials may be detected by sensing the rate of change of the background scenery, since commercials tend to have higher scenery change rates than television program content. Commercials may also be detected by keeping track of the time since commercials are often interjected at predetermined intervals within a show, e.g., every fifteen minutes or every ten minutes. These, or other methods and systems for detecting commercials, may be used in 305 to detect whether a television commercial message is beginning. If no commercial message has been detected the method proceeds from 305 along the "NO" branch to 307 to wait for a commercial and then loops back around to 305 again. In 305, once a commercial message has been detected the method proceeds from 305 along the "YES" branch to 309.

In 309 information is retrieved for controlling the PIP launch. The information may include PIP launch control parameters, PIP launch settings and/or a general PIP launch control scheme. The PIP launch control parameters specify the manner in which the PIP is displayed, e.g., the PIP size and position, the framing design (e.g., skin) and transparency characteristics, and launch effects such as a PIP which expands from a point to the full PIP size or fades-in/fades-out in a given amount of time (e.g., 1 second). The PIP launch settings may be program-specific or situation-specific PIP launch settings that react in a certain predefined manner. As such, the PIP launch settings may be specific to a particular program, situation or time frame entered by a user during a television viewing session. The PIP launch settings may specify the channel and television signal source to display in the PIP display and in the primary display upon detecting a commercial break. The PIP launch settings may also specify the actions to be taken upon detecting the end of a commercial break, e.g., back to the normal viewing state before the commercial was detected. For example, a user may set the PIP launch settings while a particular movie is being watched so that a PIP is launched upon detecting a commercial to display the channel with the movie (now playing a commercial) and the primary display turns to a different channel specified in the PIP launch settings (e.g., the Weather Channel) for the duration of the commercial. Since the PIP launch settings are program/situation-specific (or viewing session-specific) they may not always be in effect, or may only apply if a decision rule is satisfied. The PIP launch scheme information includes the PIP launch control parameters and PIP launch settings. In some embodiments, the PIP channel may be a primary PIP channel and the PIP launch control parameters and PIP launch settings may specify a secondary PIP channel (and possibly a third PIP channel, etc.). In these embodiments, if the primary PIP channel also has a commercial when the PIP is launched, the secondary PIP channel will be launched in the PIP window. The PIP launch scheme may also include the logic for implementing the auto PIP launch feature, including PIP launch control parameters and launch settings as well as any predefined default conditions or decision rules, and all the software, routines, drivers or other logic used in practicing the various embodiments. The PIP launch settings may either be default settings included with the system at the time it is sold, or settings that the user adjusts or creates, or a combination of both.

In some embodiments the controller 135 of the television receiver system 100 retrieves the PIP launch settings, PIP launch control parameters, or other PIP launch scheme information from memory 133. In other embodiments, some or all of the PIP launch settings, control parameters and computer program for implementing the auto PIP launch feature may be stored in a remote control 141 configured to control the television receiver system 100. The PIP launch settings and control parameters include one or more definitions of the actions to be taken once a commercial message has been detected, depending upon the situation specified. For example, if the PIP display is not being used at the time the commercial starts, the system may be set to launch an on-screen guide in the main viewing display and the channel of the program being watched in the PIP display. On the other hand, if the user is watching one television program in the primary display and another program in the PIP display, the PIP launch settings may be set to switch displays upon detecting a commercial during the program in the primary display. Once the displays have been switched (with the commercial now being in the PIP display) the PIP launch settings may either be set to switch the displays back upon detecting the end of the commercial messages or to leave the displays as they are until the user decides to enlarge the program now playing in the PIP (the channel which had the commercial) into the primary display.

Some embodiments may be implemented on television sets capable of displaying two or more PIP displays. In such situations the PIP launch settings may be set to launch multiple PIPs upon detecting a commercial message in the primary display. For example, one of the PIP displays could be launched to display the channel formerly showing the program in the primary display (now showing the commercial), while the primary display depicts an on-screen program schedule guide and the second PIP depicts the video signal or information associated with a channel highlighted on the on-screen schedule guide. Many other combinations of PIP displays and primary displays known by those of ordinary skill in the art may be launched using the auto PIP launch feature in accordance with various embodiments.

Once the auto PIP launch settings and control parameters have been retrieved in 309, the method proceeds to 311 and the PIP display is launched. As mentioned above, if the PIP display is already in use, then "launching" the PIP display may entail switching the PIP program to the primary display and showing the detected commercial (from the program being watched in the primary display) in the PIP display. Once the PIP has been launched in 311 the method proceeds to 313 to detect the end of the commercial break. If the commercial has not yet been detected in 313 the method proceeds to 315 along the "NO" branch to wait for the end of the commercial messages.

Once the end of the commercial has been detected and the television signal of interest comes back on, the method proceeds from 313 along the "YES" branch to 317.

In 317, the settings of the television may be returned to their normal state, that is, to the state specified in the settings and control parameters. Typically, the normal state is to once again display the program of interest (which had been interrupted by commercials) in the primary window. If the PIP was being viewed prior to the commercials, then the PIP typically will once again be shown as before, since the user may be monitoring a program of secondary interest in the PIP display. However, if the PIP was not being viewed before the commercial was detected in 305 then, typically, the television system 100 returns to its normal state in 317 and the PIP display disappears. Once the television system 100 is returned to its normal, predefined state in 317, the method proceeds to 303 to again wait for a commercial message. If, in 303, the auto PIP launch feature is disabled, or the television is turned off, the method proceeds to 319 and ends.

Various steps or activities may be included or excluded as described above, or may be performed in an order different from that depicted in the figure, with the rest of the activities still remaining within the scope of at least one exemplary embodiment. For example, in some embodiments the blocks 313 and 315 may be omitted so that once the PIP and the main windows are switched due to a commercial being detected, they remain switched and the user must manually switch them back if the user so desires—that is, block 317 may be performed manually. In such embodiments blocks 313-317 are simply omitted and the method proceeds from 311 back to 303 (not shown). In some embodiments the user may become interested in the program airing on the PIP channel and may end up skipping what was on the main display and changing the main display channel to play what had been the PIP channel, or the user may select a new main channel and PIP channel. In such embodiments there are steps, for example, between 311 and 313 (or following 317), to allow the user to select a new primary channel and/or PIP channel.

The invention may be implemented with any sort of processing units, processors and controllers (e.g., controller 135 of FIG. 1) capable of performing the stated functions and activities. For example, the controller 135 may be embodied as a microprocessor, microcontroller, DSP, RISC processor, or any other type of processor or hardwired logic that one of ordinary skill would recognize as being capable of performing the functions described herein. A processing unit in accordance with some embodiments may operate computer software programs stored (embodied) on computer-readable medium such as the memory 133, e.g. hard disk, CD, flash memory, ram, or other computer readable medium as recognized by one of ordinary skill in the art, or the computer software programs may be transmitted wirelessly to the processing unit. The computer software programs can aid or perform the steps and activities described above. For example, computer programs in accordance with at least one exemplary embodiment may include: source code for detecting a commercial as per 305 or detecting the end of the commercials as per 313 of FIG. 3, source code for retrieving the auto PIP settings and control parameters as per 309, source code for launching the PIP display as per 311, and source code for returning the television set back to the normal, predefined state as per 317. There are many further source codes that may be written to perform the stated steps and procedures above, and these are intended to lie within the scope of exemplary embodiments.

The use of the word "exemplary" in this disclosure is intended to mean that the embodiment or element so described serves as an example, instance, or illustration, and is not necessarily to be construed as preferred or advantageous over other embodiments or elements. The term "PIP display" has been used herein for the purposes of describing and enabling the invention. However, other terms are known in the art which may be used interchangeably with "PIP display" such as "PIP picture," "PIP window," "PIP section," "PIP," "picture-on-picture," or other like terms. Similarly, although the term "primary display" has been used herein, other terms may be used in place of this term such as "main display," "main window," or the like. Further, the terms "first display area" and "second display area" may be used in place of, or interchangeably with, the terms "primary display" and "PIP display." The term PIP launch scheme information, as used herein, may include the PIP launch settings and the PIP launch control parameters. The PIP launch scheme may further include the software, routines and drivers used to implement the auto PIP feature. Various embodiments have been described in terms of the PIP display being launched "automatically." By "automatically" it is meant that the PIP is launched without requiring user intervention in response to a commercial being detected. The PIP may be launched in accordance with PIP launch scheme information including predefined PIP launch settings and/or PIP launch control parameters.

The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method for launching a picture-in-picture display on a screen of a television, the method comprising:
   detecting a commercial break during a television broadcast;
   retrieving picture-in-picture launch scheme information comprising PIP launch settings which indicate that an on-screen guide providing channel and schedule information is to be displayed in the primary television display during the commercial break; and
   launching the picture-in-picture display in response to detection of said commercial break;
   wherein said picture-in-picture display is launched in accordance with the picture-in-picture launch scheme information such that said on-screen guide providing channel and schedule information is automatically displayed in the primary television display during the commercial break.

2. The method according to claim 1, further comprising:
   detecting an end of the commercial break; and
   returning the television screen to a normal state in response to detection of the end of the commercial break.

3. The method according to claim 1, wherein said picture-in-picture launch scheme information comprises PIP launch control parameters which indicate a size and position of the picture-in-picture display.

4. The method according to claim 1, further comprising:
   showing the television broadcast in the picture-in-picture display during the commercial break.

5. The method according to claim 1, wherein the picture-in-picture launch scheme information is retrieved from a memory associated with the television.

6. The method according to claim 1, wherein the television detects the commercial break and the picture-in-picture launch scheme information is retrieved by the television from a transmission from a remote control to the television.

7. The method according to claim 1, further comprising:
   launching another picture-in-picture display that displays information based on a channel displayed in said on-screen guide, such that two PIP windows are displayed in the primary television display simultaneously.

8. A method for launching a picture-in-picture display on a screen of a television, the method comprising:
- detecting a commercial break during a television broadcast;
- retrieving picture-in-picture launch scheme information; and
- launching the picture-in-picture display in response to detection of said commercial break;
- wherein said picture-in-picture display is launched in accordance with the picture-in-picture launch scheme information, and wherein said television broadcast is a first television broadcast, and wherein said picture-in-picture launch scheme information comprises information associated with a second television broadcast and a third television broadcast, the method further comprising:
- showing the first television broadcast in the picture-in-picture display during the commercial break; and
- showing the third television broadcast in a primary television display during the commercial break in response to the detection of said commercial break and detection of a commercial message being shown on the second television broadcast.

9. A television system comprising:
- a television screen configured to selectively display a picture-in-picture display and a primary display;
- logic for detecting a commercial break during a television broadcast; and
- a memory configured to store picture-in-picture launch scheme information comprising PIP launch settings which indicate that an on-screen guide providing channel and schedule information is to be displayed in the primary television display during the commercial break;
- wherein said logic is configured to launch the picture-in-picture display in response to detection of said commercial break and in accordance with the picture-in-picture launch scheme information so that said on-screen guide providing channel and schedule information is automatically displayed in the primary television display during the commercial break.

10. The television system according to claim 9, further comprising:
- a primary video signal processor configured to process first television signals for displaying on the primary display of the television screen; and
- a supplemental video signal processor configured to process second television signals for displaying the picture-in-picture display on the television screen.

11. The television system according to claim 9, further comprising:
- a controller comprising said logic, wherein said controller is a microprocessor.

12. The television system according to claim 9, wherein the logic is further configured to detect an end of the commercial break, and return the television screen to a normal state in response to detection of the end of the commercial break.

13. The television system according to claim 9, wherein said picture-in-picture launch scheme information comprises PIP launch control parameters which indicate a size and position of the picture-in-picture display.

14. The television system according to claim 13, wherein the television detects the commercial break and the picture-in-picture launch scheme information is retrieved by the television from a remote control by transmitting the picture-in-picture launch scheme information from the remote control to the television, and the picture-in-picture launch scheme information is stored in said memory.

15. The television system according to claim 9,
- wherein the logic is configured to display the television broadcast in the picture-in-picture display during the commercial break.

16. The television system according to claim 9, wherein said logic is configured to launch another picture-in-picture display that displays information based on a channel displayed in said on-screen guide, so that two PIP windows are displayed in the primary television display simultaneously.

17. A television system comprising:
- a television screen configured to selectively display a picture-in-picture display and a primary display;
- logic for detecting a commercial break during a television broadcast; and
- a memory configured to store picture-in-picture launch scheme information;
- wherein said logic is configured to launch the picture-in-picture display in response to detection of said commercial break and in accordance with the picture-in-picture launch scheme information, wherein said television broadcast is a first television broadcast, and wherein said picture-in-picture launch scheme information comprises information associated with a second television broadcast and a third television broadcast, the system further comprising:
- logic to control showing of the first television broadcast in the picture-in-picture display during the commercial break; and
- logic to control showing of the third television broadcast in the primary display during the commercial break if a commercial message is being shown on the second television broadcast.

* * * * *